United States Patent
Takemoto et al.

(10) Patent No.: US 9,620,801 B2
(45) Date of Patent: Apr. 11, 2017

(54) ION EXCHANGER AND COOLER HAVING ION EXCHANGER

(71) Applicants: NISSAN MOTOR CO., LTD., Yokohama-shi (JP); ROKI CO., LTD., Hamamatsu-shi, Shizuoka (JP)

(72) Inventors: Shinichiro Takemoto, Yokohama (JP); Satoshi Shirayanagi, Hamamatsu (JP)

(73) Assignees: NISSAN MOTOR CO., LTD., Yokohama-shi (JP); ROKI CO., LTD., Hamamatsu-shi (JP)

( * ) Notice: Subject to any disclaimer, the term of this patent is extended or adjusted under 35 U.S.C. 154(b) by 420 days.

(21) Appl. No.: 14/351,288

(22) PCT Filed: Oct. 5, 2012

(86) PCT No.: PCT/JP2012/075964
§ 371 (c)(1),
(2) Date: Apr. 11, 2014

(87) PCT Pub. No.: WO2013/054758
PCT Pub. Date: Apr. 18, 2013

(65) Prior Publication Data
US 2014/0248550 A1    Sep. 4, 2014

(30) Foreign Application Priority Data
Oct. 14, 2011    (JP) ................. 2011-226629

(51) Int. Cl.
*H01M 8/04*    (2016.01)
*C02F 1/42*    (2006.01)
(Continued)

(52) U.S. Cl.
CPC ....... *H01M 8/04701* (2013.01); *B01J 47/022* (2013.01); *C02F 1/006* (2013.01);
(Continued)

(58) Field of Classification Search
None
See application file for complete search history.

(56) References Cited

U.S. PATENT DOCUMENTS

| 2005/0023223 A1* | 2/2005 | Takashima ......... | B01D 39/1623 210/665 |
| 2005/0058868 A1* | 3/2005 | Taga ................. | H01M 8/04007 429/434 |

(Continued)

FOREIGN PATENT DOCUMENTS

| CN | 2625091 Y | 7/2004 |
| JP | 6-57489 U | 8/1994 |

(Continued)

OTHER PUBLICATIONS

Chinese Office Action, Jan. 30, 2015, 9 pages.

*Primary Examiner* — Ula C Ruddock
*Assistant Examiner* — Matthew Van Oudenaren
(74) *Attorney, Agent, or Firm* — Foley & Lardner LLP

(57) ABSTRACT

An ion exchanger configured to remove an impurity ion of a coolant for cooling a fuel cell, the ion exchanger includes an inflow portion having an inflow path where the coolant enters, a discharge portion having a discharge path for discharging the coolant, an outer casing having an upstream end where the inflow portion is provided and a downstream end where the discharge portion is provided, an inner casing housed inside the outer casing, an outer path formed between the inner casing and the outer casing to cause the inflow path and the discharge path to communicate with each other, and an inner path that is formed inside the inner casing to cause the inflow path and the discharge path to communicate with each other and is configured to enclose an ion exchange resin capable of removing an impurity ion of (Continued)

the coolant. The inner casing has a through-hole that causes the inner path end the outer path to communicate with each other.

15 Claims, 13 Drawing Sheets

(51) Int. Cl.
H01M 8/04701 (2016.01)
H01M 8/04029 (2016.01)
H01M 8/04044 (2016.01)
B01J 47/022 (2017.01)
C02F 1/00 (2006.01)
B01J 47/026 (2017.01)
H01M 8/1018 (2016.01)
C02F 103/02 (2006.01)

(52) U.S. Cl.
CPC ........... *C02F 1/42* (2013.01); *H01M 8/04029* (2013.01); *H01M 8/04044* (2013.01); *B01J 47/026* (2013.01); *C02F 2103/023* (2013.01); *C02F 2301/024* (2013.01); *C02F 2301/026* (2013.01); *C02F 2301/028* (2013.01); *H01M 2008/1095* (2013.01)

(56) References Cited

U.S. PATENT DOCUMENTS

| 2005/0115884 A1* | 6/2005 | Suzuki | B01J 47/024 |
| | | | 210/282 |
| 2012/0148930 A1* | 6/2012 | Beylich | B01J 47/024 |
| | | | 429/434 |

FOREIGN PATENT DOCUMENTS

| JP | 2005-71709 A | | 3/2005 |
| JP | 2008132403 | * | 11/2006 |
| JP | 2008-132403 A | | 6/2008 |
| JP | 2009-219954 A | | 10/2009 |
| JP | 2010-153264 A | | 7/2010 |
| WO | WO 2011/018508 A1 | | 2/2011 |
| WO | WO2011018508 | * | 2/2011 |

* cited by examiner

ION EXCHANGER AND COOLER HAVING ION EXCHANGER

TECHNICAL FIELD

The present invention relates to an ion exchanger for removing an impurity ion from a fluid and a cooler having the ion exchanger.

BACKGROUND ART

A fuel cell includes an anode, a cathode, and an electrolytic membrane interposed therebetween. The fuel cell generates electric power using an anode gas containing hydrogen supplied to the anode and a cathode gas containing oxygen supplied to the cathode. An electrochemical reaction generated in both the anode and the cathode can be expressed as follows.

Anode: $2H_2 \rightarrow 4H^+ + 4e^-$ (1)

Cathode: $4H^+ + 4e^- + O_2 \rightarrow 2H_2O$ (2)

Through the electrochemical reaction of Expressions (1) and (2), the fuel cell generates an electromotive force of, approximately, 1 V.

When the fuel cell is employed as a power source of a vehicle, a fuel cell stack obtained by stacking several hundreds of fuel cells is used. In addition, a fuel cell system capable of supplying an anode gas and a cathode gas to the fuel cell stack is provided to output electric power for driving a vehicle.

In such a fuel cell system, a coolant circulation path is provided to cool the fuel cell stack. If the fuel cell system is used for a long time, an impurity ion such as $Na^+$ or $SO_4^{2-}$ is eluted to the coolant from a pipe or the like of the circulation path, so that electric conductivity of the coolant increases, and power generation performance of the fuel cell stack is deteriorated. For this reason, an ion exchanger for removing an impurity ion from the coolant is provided in the coolant circulation path. In the ion exchanger, it is preferable that an ion exchange rate relating to impurity ion removal performance be high and a pressure loss which is a pressure difference between an inlet side and an outlet side be small.

JP 2009-219954 A discloses a dual channel structure ion exchanger having an inner pipe and an outer pipe. In this ion exchanger, one of a path formed inside the inner pipe and a path formed between the inner and outer pipes serves as an ion exchange path filled with an ion exchange resin, and the other path serves as a bypass path.

SUMMARY OF INVENTION

In the ion exchanger described above, a cross-sectional area of the flow path is reduced in the center of the bypass path. Therefore, a pressure loss in the bypass path easily increases. In addition, it is difficult to improve both the ion exchange rate and the pressure loss.

It is therefore an object of the present invention to provide an ion exchanger capable of suppressing an increase of the pressure loss and improving the ion exchange rate.

According to an aspect of the present invention, an ion exchanger configured to remove an impurity ion of a coolant for cooling a fuel cell is provided. The ion exchanger includes an inflow portion having an inflow path where the coolant enters, a discharge portion having a discharge path for discharging the coolant, an outer casing having an upstream end where the inflow portion is provided and a downstream end where the discharge portion is provided, an inner casing housed inside the outer casing, an outer path formed between the inner casing and the outer casing to cause the inflow path and the discharge path to communicate with each other, and an inner path that is formed inside the inner casing to cause the inflow path and the discharge path to communicate with each other and is configured to enclose an ton exchange resin capable of removing an impurity ion of the coolant. The inner casing has a through-hole that causes the inner path and the outer path to communicate with each other.

Embodiments and advantages of this invention will be described in detail below with reference to the attached figures.

BRIEF DESCRIPTION OF DRAWINGS

DESCRIPTION OF EMBODIMENTS (First Embodiment) FIG. 1 is a schematic view illustrating a fuel cell system 1 having an ion exchanger 100 according to a first embodiment of the present invention.

As illustrated in FIG. 1, the fuel cell system 1 includes a fuel cell stack 10, a cooler 20 that cools the fuel cell stack 10, and a controller 30 that executes a system control.

Figure 1:
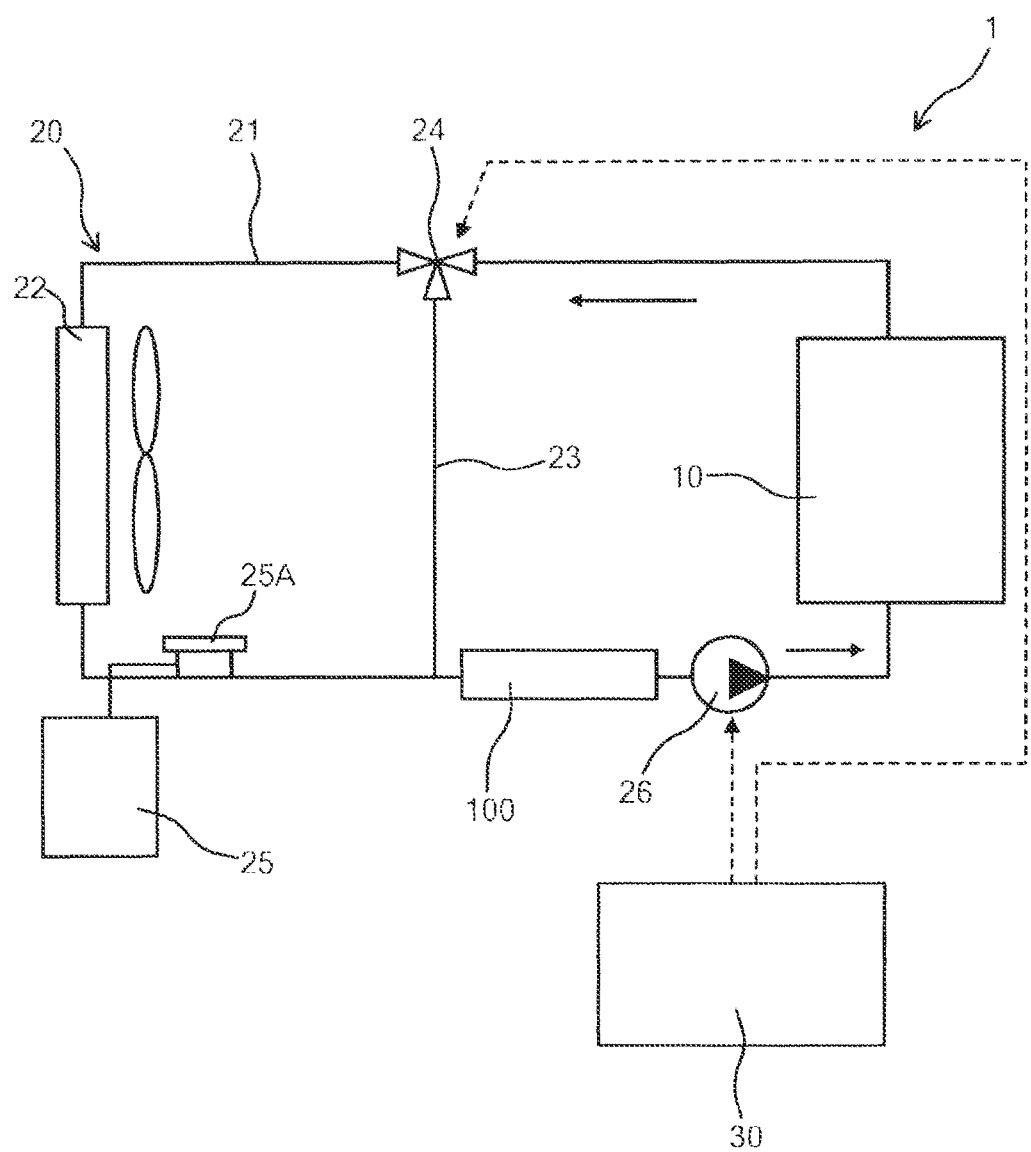
FIG. 1 is a schematic view illustrating a fuel cell system having an ion exchanger according to a first embodiment of the invention.

The fuel cell stack 10 is configured by stacking a predetermined number of fuel cells. The fuel cell stack 10 generates electric power using an anode gas supplied from an anode gas supply unit and a cathode gas supplied from a cathode gas supply unit. The electric power generated by the fuel cell stack 10 is supplied to various electric devices such as a driving motor for driving a vehicle.

The cooler 20 is a device for cooling the fuel cell stack 10 using a coolant. As the coolant, pure water or a glycol-based antifreeze fluid may be employed. The cooler 20 includes a coolant circulation path 21, a radiator 22, a bypass path 23, a three-way valve 24, a reservoir 25, a circulating pump 26, and the ion exchanger 100.

The coolant circulation path 21 is a path where a coolant for cooling the fuel cell stack 10 flows. One end of the coolant circulation path 21 is connected to a coolant inlet port of the fuel cell stack 10, and the other end is connected to a coolant outlet port of the fuel cell stack 10.

The radiator 22 is a heat radiating device capable of cooling the coolant discharged from the fuel cell stack 10 and is provided in the coolant circulation path 21.

The bypass path 23 is connected to the coolant circulation path 21 by bypassing the radiator 22.

The three-way valve 24 is provided in a junction between the coolant circulation path 21 in the upstream side from the radiator 22 and the bypass path 23. The three-way valve 24 is a flow rate adjustment member that adjusts a flow rate of the coolant flowing to the radiator 22 and a flow rate of the coolant flowing to the bypass path 23. An opening degree of the three-way valve 24 is controlled by the controller 30 based on a cooling load state and the like.

The reservoir 25 is provided in the coolant circulation path 21 between the radiator 22 and a downstream end junction of the bypass path 23. The reservoir 25 has a cap 25A opened and closed depending on a pressure of the coolant in the coolant circulation path 21. When the pressure in the coolant circulation path 21 is high, a part of the coolant flowing through the coolant circulation path 21 is supplied to the reservoir 25 through the cap 25A. When the pressure in the coolant circulation path 21 is low, the coolant in the reservoir 25 is supplied to the coolant circulation path 21 through the cap 25A. As a result, the pressure of the coolant, in the coolant circulation path 21 is maintained within a predetermined pressure range.

The circulating pump 26 is a forced feed device for circulating the coolant. The circulation pump 26 is provided in the coolant circulation path 21 between the fuel cell stack 10 and the downstream end junction of the bypass path 23. A discharge flow rate of the circulating pump 26 is controlled by the controller 30.

The ion exchanger 100 is provided in the coolant circulation path 21 between the circulating pump 26 and the coolant circulation path 21 in the downstream side from the radiator 22, for example, the downstream end junction of the bypass path 23. A granular ion exchanger resin capable of removing an impurity ion is enclosed in the ion exchanger 100. The ion exchanger 100 lowers the electric conductivity of the coolant by removing an impurity ion included in the coolant.

The controller 30 includes a microcomputer having a central processing unit (CPU), a read-only memory (ROM), a random access memory (RAM), and an input/output interlace (I/O interface). The controller 30 receives signals from various sensors that detect a driving condition of the fuel cell stack 10 and controls the three-way valve 24, the circulating pump 26, and the like based on such input signals.

Figure 2A:
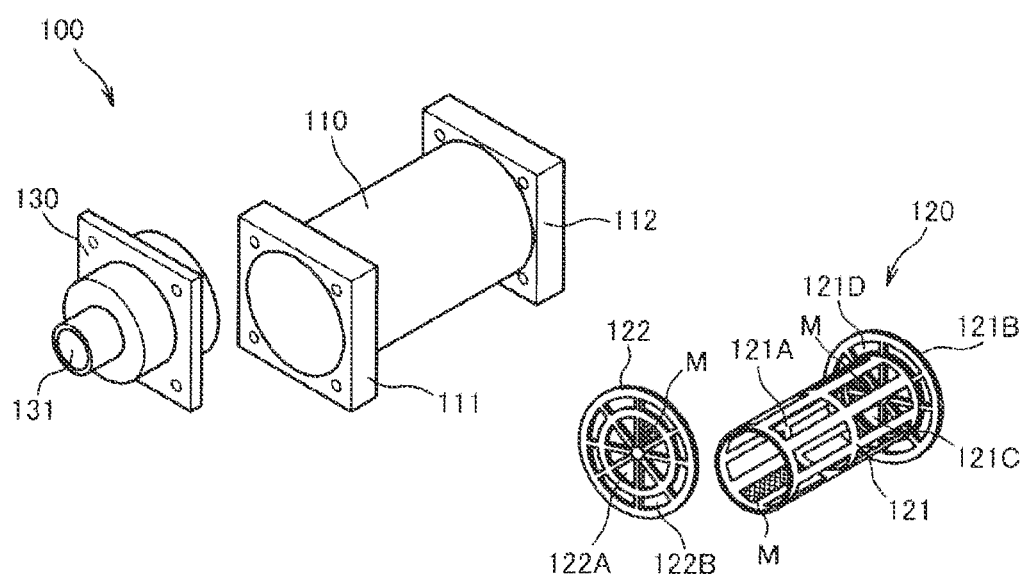
FIG. 2A is an exploded perspective view illustrating the ion exchanger provided in a cooler of the fuel cell system.
Figure 2B:
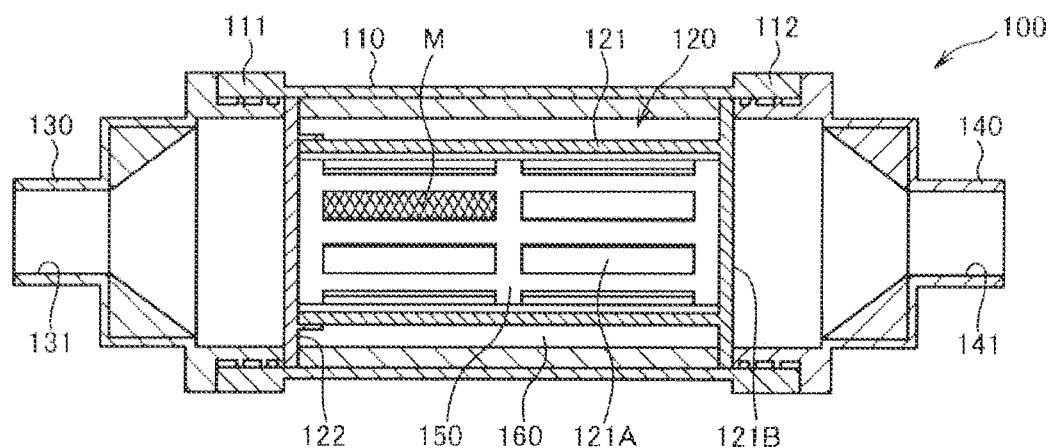
FIG. 2B is a longitudinal cross-sectional view illustrating the ion exchanger.

A configuration of the ion exchanger 100 will be described with reference to FIGS. 2A to 2C. FIG. 2A is an exploded perspective view illustrating the ion exchanger 100. FIG. 2B is a longitudinal cross-sectional view illustrating the ion exchanger 100, and FIG. 2C is a left side view illustrating the ion exchanger 100.

Figure 2C:
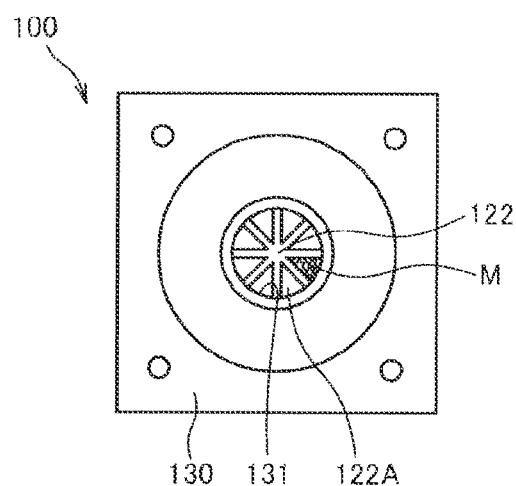
FIG. 2C is a side view illustrating an upstream end side of the ion exchanger.

Referring in FIGS. 2A to 2C, the ion exchanger 100 includes an outer casing 110, an inner casing 120 coaxially arranged inside the outer casing 110, and cap members 130 and 140 installed in both ends of the outer casing 110.

The outer casing 110 is a cylindrical frame. Each of the upstream end 111 and the downstream end 112 of the outer casing 110 is formed as an opening end. The cap member 130 is installed in the upstream end 111 of the outer casing 110, and the cap member 140 is installed in the downstream end 112 of the outer casing 110.

The cap member 130 is configured as an inflow portion having an inflow path 131 for flowing the coolant into the ion exchanger 100 from the coolant circulation path 21. The inflow path 131 is formed such that a diameter of the inflow path 131 gradually increases along a flow direction of the coolant, that is, from the upstream side to the downstream side in an axial direction of the ion exchanger 100.

The cap member 140 is configured as a discharge portion having a discharge path 141 for discharging rise coolant from the ion exchanger 100 to the coolant circulation path 21. The discharge path 141 is formed such that a diameter of the discharge path 141 is gradually reduced along the flow direction of the coolant, that is, from the upstream side to the downstream side in the axial direction of the ion exchanger 100.

The inner casing 120 is a cylindrical frame. The inner casing 120 is coaxially arranged inside the outer casing 110. While the inner casing 120 is provided inside the outer casing 110, the inside of the inner casing 120 serves as an inner path 150, and a gap between the outer casing 110 and the inner casing 120 serves as an other path 160.

The inner casing 120 includes a cylindrical portion 121 opened to the upstream end and a lid portion 122 provided in the opening end of the cylindrical portion 121.

A plurality of rectangular through-holes 121A causing the inner path 150 to communicate with the outer path 160 are formed on the outer circumferential surface (side surface) of the cylindrical portion 121. The through-holes 121A are arranged side by side with a predetermined interval in an axial direction of the cylindrical portion 121 and with a predetermined interval in an outer circumferential direction of the cylindrical portion 121.

The downstream end 121B of the cylindrical portion 121 is formed in a circular disk shape. A plurality of communicating portions 121C and 121D where the coolant can pass are formed in the downstream end 121B. A plurality of communicating portions 121C are arranged side by side with a predetermined interval around a center of the downstream end 121B. The communicating portions 121C are formed to cause the inner path 150 and the discharge path 141 to communicate with each other and are positioned in the vicinity of the center of the downstream end 121B. A plurality of communicating portions 121D are arranged side by side with a predetermined interval around the center of the downstream end 121B. The communicating portions 121D are formed to cause the outer path 160 and the discharge path 141 to communicate with each other and are positioned in the vicinity of an outer periphery of the downstream end 121B corresponding to an outer side from the communicating portion 121C in a radial direction.

The lid portion 122 is a disk-like member detachable installed in the opening end of the cylindrical portion 121. The lid portion 122 serves as an upstream end of the cylindrical portion 121. A plurality of communicating portions 122A and 122B where the coolant can pass are formed in the lid portion 122A. A plurality of communicating portions 122A are arranged side by side with a predetermined interval around the center of the lid portion 122. The communicating portions 122A are formed to cause the inflow path 131 and the inner path 150 to communicate with each other and are positioned in the vicinity of rise center of the lid portion 122. A plurality of communicating portions 122B are arranged side by side with a predetermined interval around the center of the lid portion 122. The communicating portions 122B are formed to cause the inflow path 131 and the outer path 160 to communicate with each other and are positioned in the vicinity of the outer periphery of the lid portion 122 corresponding to the outer side from the communicating portion 122A in a radial direction.

An ion exchange resin for removing an impurity ion from the coolant is filled in the inside of the inner casing 120 including the cylindrical portion 121 and the lid portion 122, that is, inside the inner path 150. Since the ion exchange resin is granular, in order to prevent the ion exchange resin from leaking from the inner casing 120, a mesh M having a screen opening (sieve opening) smaller than a particle size of the ion exchange resin is provided in the through-hole 121A of the inner casing 120 and the communicating portions 121C and 122A. The screen opening of the mesh M is set to, approximately, 200 microns. Although, in FIGS. 2A and 2C, the mesh M is provided only in a part of the through-holes 121A and the communicating portions 121C and 122A, the mesh M are provided in all through-holes 121A and communicating portions 121C and 122A in practice.

Figure 3:
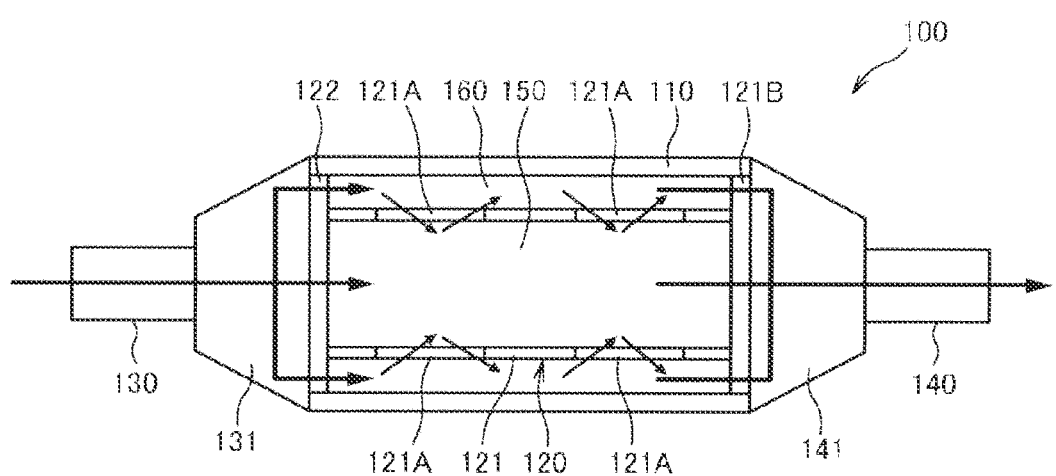
FIG. 3 is a diagram schematically illustrating a longitudinal cross section of the ion exchanger.

A flow of the coolant passing through the ion exchanger 100 will be described with reference to FIGS. 2A, 2B, and 3. FIG. 3 is a diagram schematically illustrating a longitudinal cross section of the ion exchanger 100.

The coolant flowing trough the coolant circulation path 21 enters the ion exchanger 100 through the inflow path 131 of the cap member 130. The coolant of the inflow path 131 enters the inner path 150 through the communicating portion 122A of the lid portion 122 of the inner casing 120. In addition, the coolant of the inflow path 131 enters the outer path 160 through the communicating portion 122B of the lid portion 122 of the inner casing 120.

The coolant flowing through the inner path 150 and the outer path 160 flows to the downstream side by switching a channel between the inner path 150 and the outer path 160 through the through-hole 121A of the cylindrical portion 121 as indicated by the arrow of FIG. 3. That is, a part of the coolant flowing through the outer path 160 flows to the inner path 150 through the through-hole 121A, and a part of the coolant flowing through the inner path 150 flows to the outer path 160 through the through-hole 121A. An impurity ion of the coolant is removed by the ion exchange resin when it passes through the inner path 150. As a result, the electric conductivity of the coolant decreases.

Then, the coolant arriving at the downstream of the inner path 150 flows to the discharge path 141 through the communicating portion 121C of the downstream end 121B of the inner casing 120. The coolant arriving at the downstream of the order path 160 flows to the discharge path 141 through the communicating portion 121D of the downstream end 121B of the inner casing 120. The coolant output from the inner path 150 and the outer path 160 is discharged to the coolant circulation path 21 via the discharge path 141 and is supplied to the fuel cell stack 10.

The effects of the ion exchanger 100 will be described with references to FIGS. 4A, 4B, and 5.

Figure 4A:
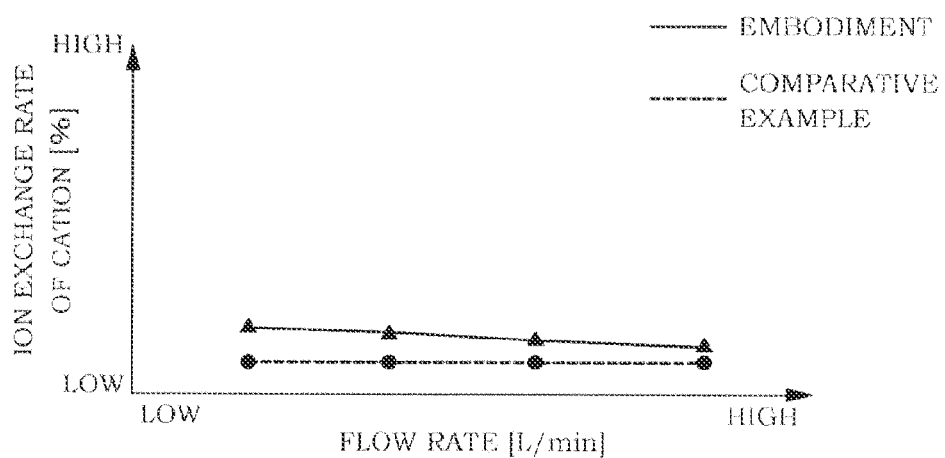
FIG. 4A is a diagram illustrating a relationship between an ion exchange rate of a cation and a flow rate of a coolant passing through the ion exchanger.

FIG. 4A is a diagram illustrating a relationship between an ion exchange rate of a cation and a flow rate of the coolant passing through the ion exchanger. FIG. 4B is a diagram illustrating a relationship between an ion exchange rate of an anion and a flow rate of the coolant passing through the ion exchanger. FIG. 5 is a diagram illustrating a relationship between a pressure loss and a flow rate of the coolant passing through the ion exchanger.

Figure 4B:
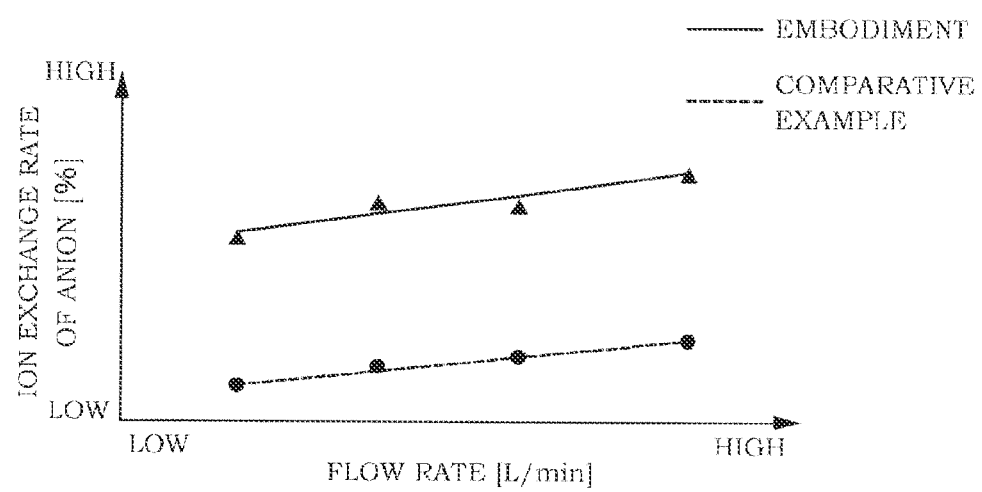
FIG. 4B is a diagram illustrating a relationship between an ion exchange rate of an anion and a flow rate of the coolant passing through the ion exchanger.
Figure 5:
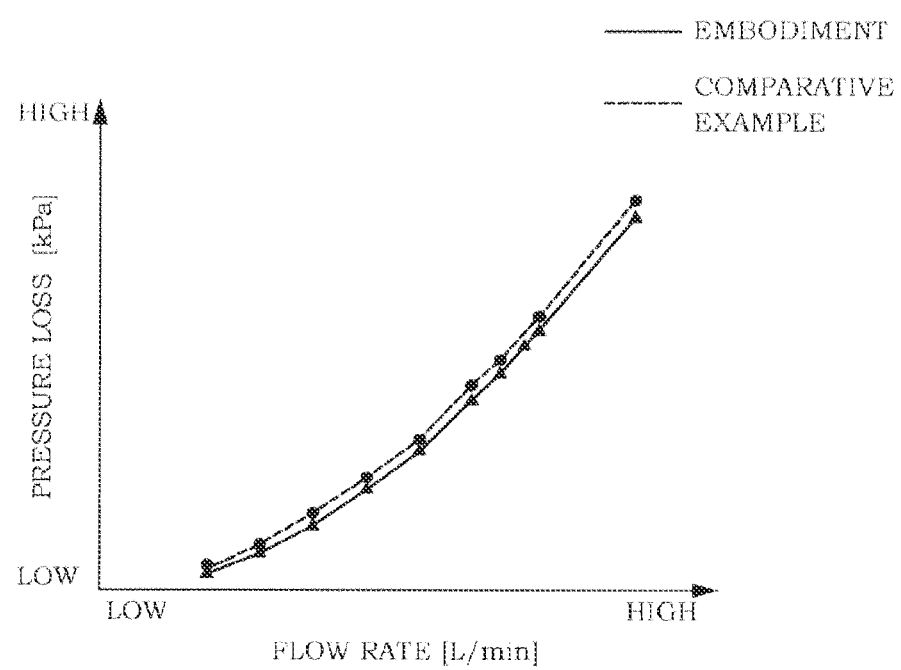
FIG. 5 is a diagram illustrating a relationship between a pressure loss and a flow rate of the coolant passing through the ion exchanger.

It is noted that, in FIGS. 4A, 4B, and 5, the solid line denotes data of the ion exchanger 100 according to the first embodiment, and the dotted line denotes data of the ion exchanger of a comparative example in which no through-hole is provided in the inner casing. In the ion exchanger of the comparative example, the coolant does not flow by switching a channel between the outer path and the inner path.

In the ion exchanger 100 according to the first embodiment, the coolant flowing through the inflow path 131 enters the inner path 150, and the coolant flowing through the outer path 160 also enters the inner path 150 through the through-hole 121A. For this reason, it is possible to remove an impurity ion using the ion exchange resin in the vicinity of the outer circumferential surface as well as in the vicinity of the front side of the inner path 150 from an initial stage of the use of the ion exchanger 100. Therefore, it is possible to increase the ion exchange rate of the ion exchanger 100. As a result, as illustrated in FIGS. 4A and 4B, the ion exchange rates of cations and anions of the ion exchanger 100 increase, relative to the ion exchange rates of cations and anions of the ion exchanger of the comparative example, within a flow rate range of the coolant anticipated by the fuel cell stack 10.

In the ion exchanger 100, since a part of the coolant flowing through the inner path 150 flows to the outer path 160 through the through-hole 121A, a pressure reduction of the coolant generated when it passes through the inner path 150 and the outer path 160 is suppressed. Therefore, it is possible to suppress an increase of the pressure loss in the ion exchanger 100. As a result, as illustrated in FIG. 5, the pressure loss of the ion exchanger 100 is reduced, relative to the pressure loss of the ion exchanger of the comparative example, within a flow rate range of the coolant anticipated by the fuel cell stack 10.

The following effects can be obtained using the ion exchanger 100 according to the first embodiment described above.

The ion exchanger 100 has a dual channel structure using the outer casing 110 and the inner casing 120 where the ion exchange resin is filled. The through-hole 121A that causes the inner path 150 and the outer path 160 to communicate with each other is formed on the outer circumferential surface of the cylindrical portion 121 of the inner casing 120. Since the coolant flowing through the inner path 150 and the outer path 160 flows to the downstream side by switching a channel between the inner path 150 and the outer path 160 through the through-hole 121A, it is possible to remove an impurity ion using the ion exchange resin in the vicinity of the outer circumferential surface of the inner casing 120 from an initial stage of the use and increase the ion exchange rate of the ion exchanger 100. In addition, since a part of the coolant of the inner path 150 flows to the outer path 160 through the through-hole 121A, it is possible to suppress an increase of the pressure loss in the ion exchanger 100.

It is noted that, in the cooler 20 of FIG. 1, since the ion exchanger 100 is provided in the coolant circulation path 21 in the downstream side from the radiator 22, it is possible to supply a low temperature coolant to the ion exchanger 100 and suppress thermal degradation of the ion exchange resin filled in tire inside of the inner casing 120.

(Second Embodiment) An ion exchanger 100 according to a second embodiment of the invention will be described with reference to FIGS. 6 and 7. The second embodiment is different from the first embodiment in the configuration of the through-hole 121A of the cylindrical portion 121 of the inner casing 120. It is noted that, in the following embodiments, like reference numerals denote like elements as in the first embodiment, and the description thereof will not be repeated.

Figure 6:
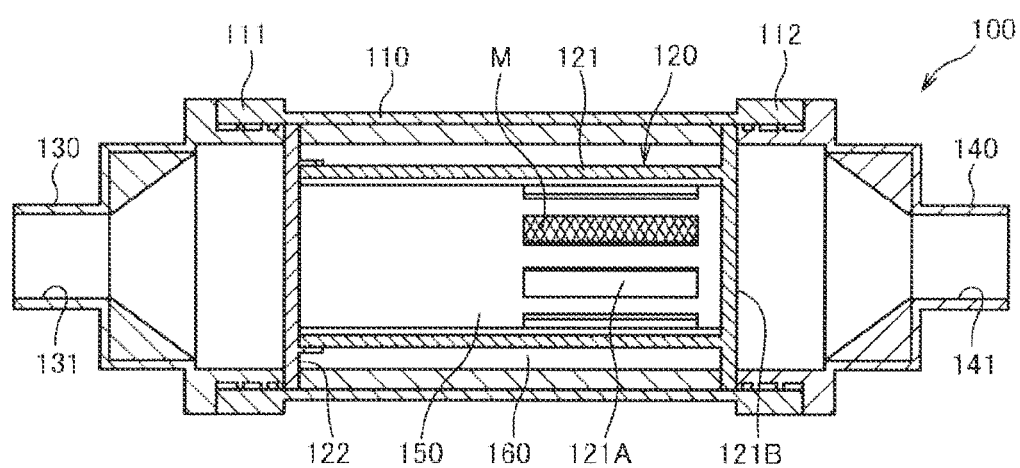
FIG. 6 is a longitudinal cross-sectional view illustrating an ion exchanger according to a second embodiment of the invention.

FIG. 6 is a longitudinal cross-sectional view illustrating the ion exchanger 100 according to the second embodiment. FIG. 7 is a diagram illustrating a relationship between an ion exchange rate and a flow volume of the coolant passing through the ion exchanger. In FIG. 7, the solid line denotes data of the ion exchanger 100 according to the first embodiment, and the dotted line denotes data of the ion exchanger 100 according to the second embodiment.

As illustrated in FIG. 6, in the ion exchanger 100 according to the second embodiment, the through-hole 121A is formed on the outer circumferential surface in the vicinity of the downstream end 121B of the cylindrical portion 121 of the inner casing 120. That is, no through-hole 121A is formed in the upstream side of the cylindrical portion 121, but the through-holes 121A are arranged side by side with a predetermined interval along an outer circumferential direction in the downstream side of the cylindrical portion 121.

In the ion exchanger 100 according to the first embodiment, since the coolant flowing through the inflow path 131 and the outer path 160 flows into the upstream side of the tuner path 150, it is likely that the ion exchange resin in the upstream side is locally used. In comparison, in the ion exchanger 100 according to the second embodiment, the coolant flowing through the inflow path 131 flows into the upstream side of the inner path 150, and the coolant flowing through the outer path 160 flows into the downstream side of the inner path 150. Therefore, it is possible to relatively uniformly use the ion exchange resin across the entire area from an initial stage of the use of the ion exchanger 100.

Figure 7:
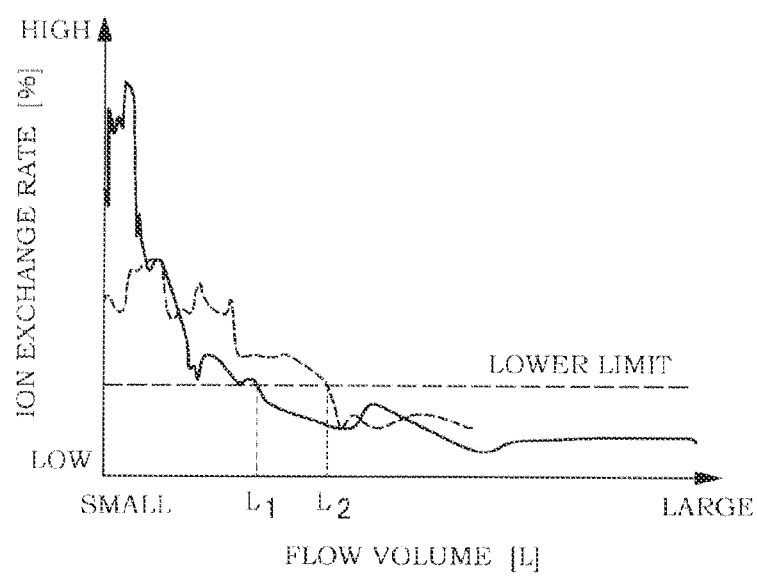
FIG. 7 is a diagram illustrating a relationship between an ion exchange rate and a flow volume of the coolant passing through the inn exchanger.

Therefore, as illustrated in FIG. 7, the flow volume L2 when the ion exchange rate of the ion exchanger 100 according to the second embodiment reaches the lower limit is larger than the flow volume L1 when the ion exchange rate of the ion exchanger 100 according to the first embodiment reaches the lower limit.

In the ion exchanger 100 according to the second embodiment, the through-hole 121A is provided on the outer circumferential surface in the vicinity of the downstream of the cylindrical portion 121 of the inner casing 120, and the coolant flowing through the outer path 160 flows into the downstream side of the inner path 150. Therefore, it is possible to relatively uniformly use the ion exchange resin across the entire area. As a result, it is possible to lengthen a period until the ion exchange rate of the ion exchanger 100 reaches the lower limit and reliably remove an impurity ion from the coolant for a long time. In addition, since a part of the coolant of the inner path 150 flows to the outer path 160 through the through-hole 121A, it is possible to suppress an increase of a pressure loss in the son exchanger 100.

(Third Embodiment) An ion exchanger 100 according to a third embodiment of the invention will be described with reference to FIG. 8. The third embodiment is different from the first and second embodiment in a configuration of mesh M provided in the through-hole 121A of the inner casing 120 and the like.

Figure 8:
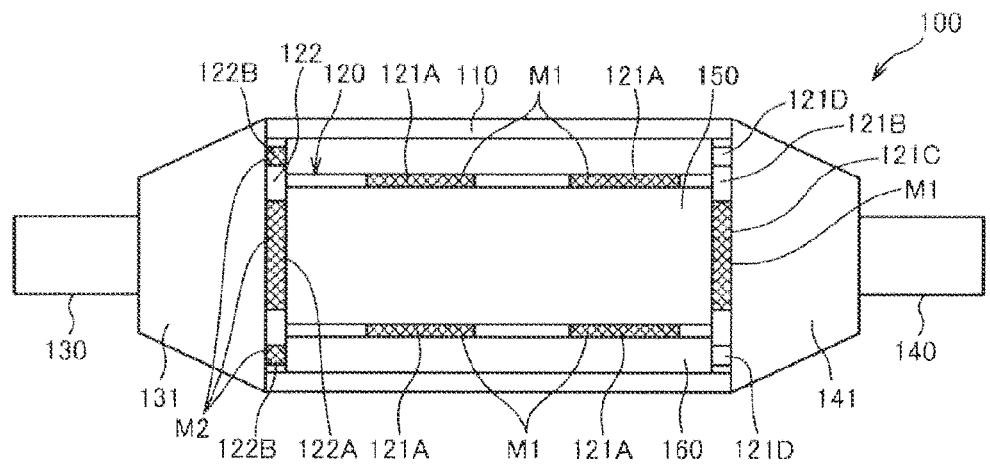
FIG. 8 is a diagram schematically illustrated a longitudinal cross section of an ion exchanger according to a third embodiment of the invention.

FIG. 8 is a diagram schematically illustrating a longitudinal cross section of the ion exchanger 100 according to the third embodiment.

As illustrated in FIG. 8, in the ion exchanger 100, meshes M1 as first meshes are provided in the through dudes 121A of the cylindrical portion 121 and the communicating portions 121C of the downstream end 121B, and meshes M2 as second meshes are provided in the communicating portions 122A and 122B of the lid portion 122.

The mesh M1 provided in the through-hole 121A and the communicating portion 121C has a screen opening smaller than a particle size of the ion exchange resin. The screen opening of the mesh M1 is set to, approximately, 200 microns. The mesh M1 prevents the ion exchange resin filled in the inner casing 120 from leaking to the outside.

The mesh M2 provided in the communicating portions 122A and 122B has a screen opening smaller than that of the mesh M1 and is capable of removing a foreign object contained in the coolant. The screen opening of the mesh M2 is set to, approximately, 100 microns. The mesh M2 serves as a filter that prevents the ion exchange resin filled in the inner casing 120 from leaking to the outside and removes a foreign object when the coolant passes.

In the ion exchanger 100 according to the third embodiment, the mesh M1 is provided in the through-hole 121A of the cylindrical portion 121 of the inner casing 120 and the communicating portion 121C of the downstream end 121B, and the mesh M2 having a screen opening smaller than that of the mash M1 is provided in the communicating portions 122A and 122B of the lid portion 122. Therefore, it is possible to prevent the ion exchange resin from leaking front the inner casing 120 and remove a foreign object contained in the coolant. As a result, it is possible to supply the fuel cell stack 10 with the coolant having a low electric conductivity and no foreign object.

Figure 9:
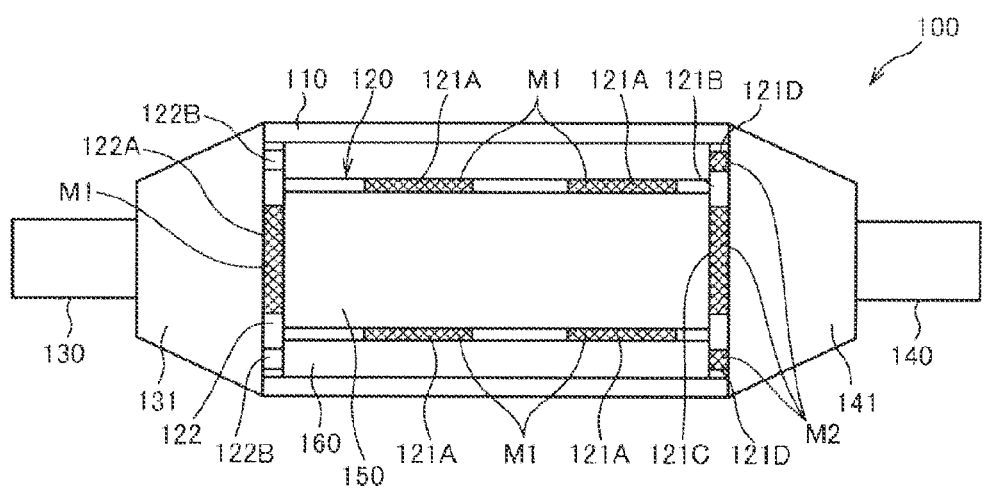
FIG. 9 is a diagram schematically illustrating a longitudinal cross section of an ion exchanger according to a modification of the third embodiment.

It is noted that, although the mesh M2 is provided in the communicating portions 122A and 122B of the lid portion 122 of the inner casing 120 in the ion exchanger 100 according to the third embodiment, the mesh M2 may also be provided in the communicating portions 121C and 121D of the downstream end 121B of the cylindrical portion 121 as illustrated in FIG. 9. In this case, the mesh M1 is provided in the through-hole 121A of the cylindrical portion 121 and the communicating portion 122A of the lid portion 122. In the ion exchanger 100 according to a modification of the third embodiment illustrated in FIG. 9, it is possible to prevent the ion exchange resin from leaking from the inner casing 120 and remove a foreign object contained in the coolant. As a result, it is possible to supply the fuel cell stack 10 with the coolant having a low electric conductivity and no foreign object.

(Fourth Embodiment) An ion exchanger 100 according to a fourth embodiment of the invention will be described with reference to FIG. 10. The fourth embodiment is different from the first to third embodiments in that a guide wall 113 for guiding the flow of the coolant is provided in the outer path 160.

Figure 10:
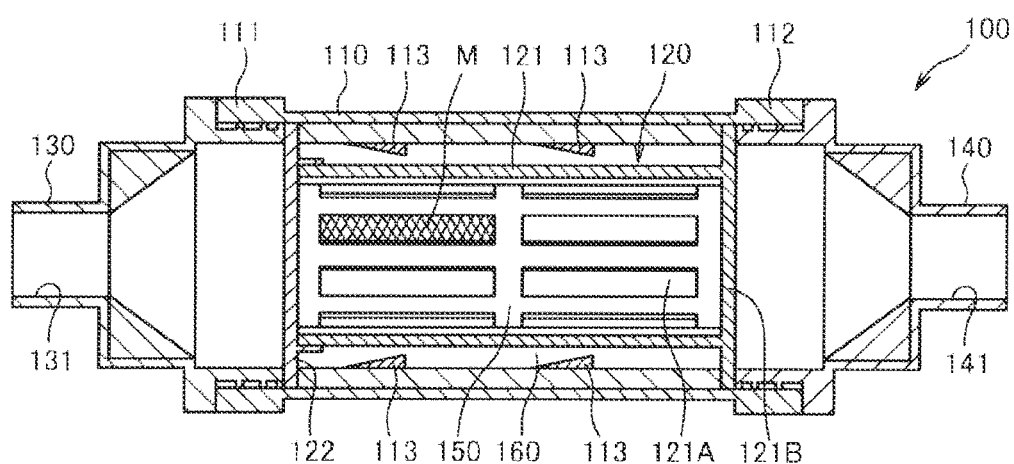
FIG. 10 is a longitudinal cross sectional view illustrating an ion exchanger according to a fourth embodiment of the invention.

FIG. 10 is a longitudinal cross-sectional view illustrating the ion exchanger 100 according to the fourth embodiment.

As illustrated in FIG. 10, in the ion exchanger 100 according to the fourth embodiment, a guide wall 113 as a wall for guiding the flow of the coolant is provided on the inner circumferential surface of the outer casing 110. The guide wall 113 is formed to protrude inward from the inner circumferential surface of the outer casing 110. The guide wall 113 is provided for each through-hole 121A of the inner casing 120 and is arranged to face the through-hole 121A. The grade wall 113 is formed such that the height protruding from the inner circumferential surface of the outer casing 110 increases from the upstream end 111 of the outer casing 110 to the downstream end 112.

In the ion exchanger 100 according to the fourth embodiment, the coolant flowing through the outer path 100 is guided to the inner casing 120 side by the guide wall 113 provided in the outer path 160. Therefore, the coolant easily flows to the inner path 150 through the through-hole 121A. As a result it is possible to improve the ion exchange rate.

In addition, since the guide wall 113 is arranged to face the through-hole 121A and is formed such that the protrusion height increases from the upstream end ill of the outer casing 110 to the downstream end 112, the coolant of the outer path 160 flows to the inner path 150 through the downstream side (the vicinity of the rear side) of each through-hole 121A. Therefore, it is possible to avoid the ion exchange resin from being locally used in the upstream side and relatively uniformly use the ion exchange resin across the entire area. As a result, it is possible to reliably remove an impurity ion of the coolant for a long time.

(Fifth Embodiment) An ion exchanger 100 according to a fifth embodiment of the invention will be described with reference to FIGS. 11 and 12. The fifth embodiment is different from the first embodiment in that a partitioning wall 170 is provided in the outer path 160.

Figure 11:
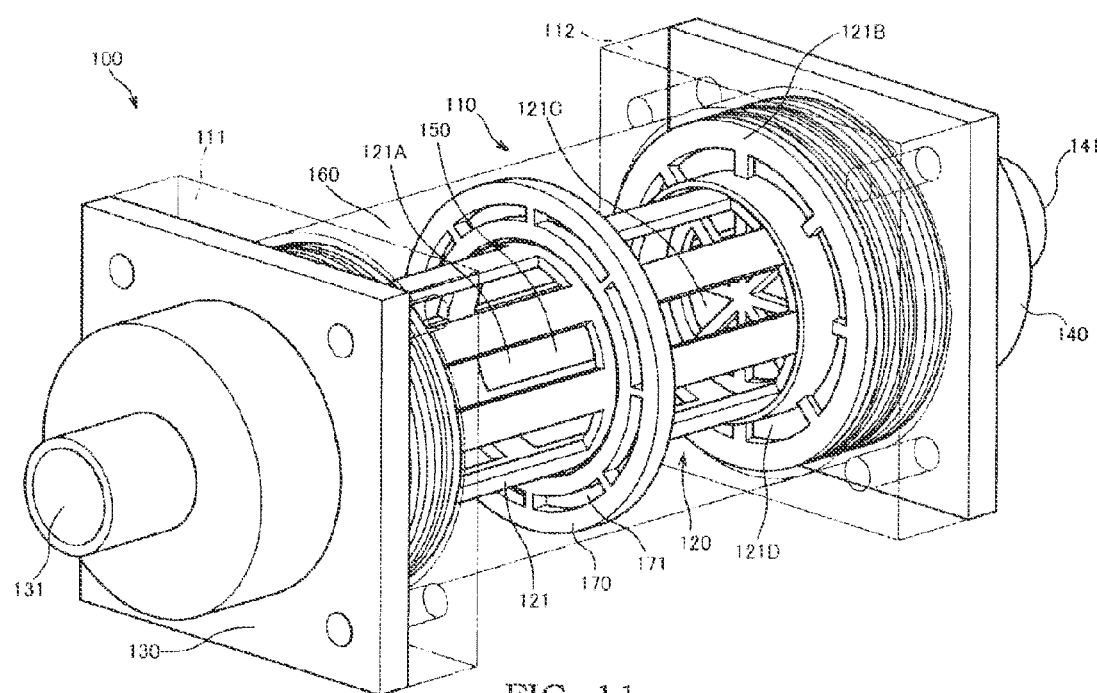
FIG. 11 is a perspective view illustrating an ion exchanger according to a fifth embodiment of the invention.

FIG. 11 is a perspective view illustrating the ion exchanger 100 according to the fifth embodiment. FIG. 12 is a diagram schematically illustrating a longitudinal cross section of the ion exchanger 100 according to the fifth embodiment.

Figure 12:
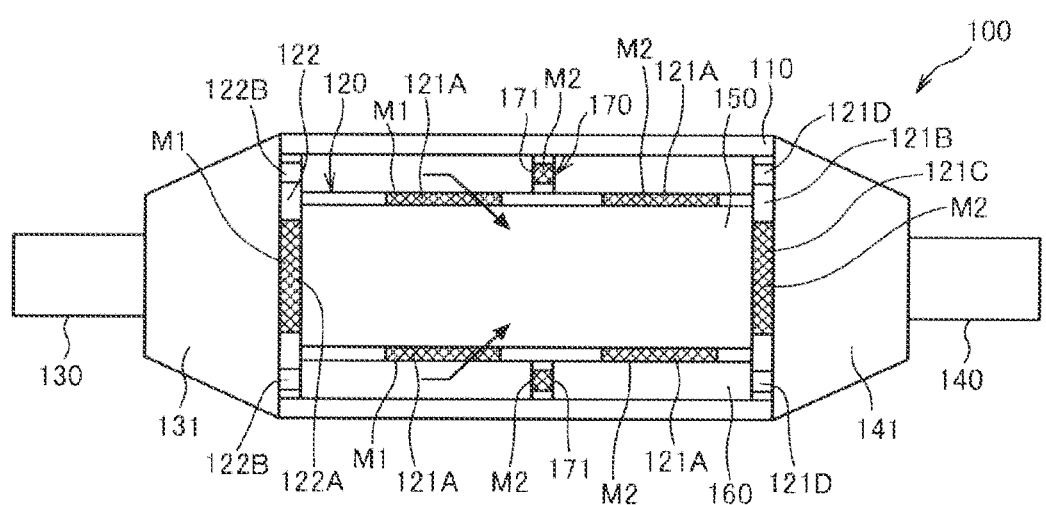
FIG. 12 is a diagram schematically illustrating a longitudinal cross section of an ion exchanger according to the fifth embodiment.

As illustrated in FIGS. 11 and 12, in the ion exchanger 100 according to the filth embodiment, a ring-like partitioning wall 170 is fitted to the outer circumferential surface of the cylindrical portion 121 of the inner casing 120. The partitioning wall 170 may be fixed to the inner circumferential surface of the outer casing 110 instead of the outer circumferential surface of the cylindrical portion 121. The partitioning wall 170 is provided in the outer path 160 so as to be positioned between the through-holes 121A of the upstream side of the cylindrical portion 121 and the through-holes 121A of the downstream side in order to partition the outer path 160 into an upstream portion and a downstream portion. The partitioning wall 170 has a plurality of communicating holes 171 that cause the upstream portion and the downstream portion of the outer path 160 to communicate with each other. The communicating holes 171 are arranged side by side along a circumferential direction of the partitioning wall 170.

The coolant flowing into the outer path 160 flows from the upstream portion to the downstream portion through the communicating hole 171 of the partitioning wall 170. Since there is the partitioning wall 170 between the upstream portion and the downstream portion of the outer path 160, the coolant in the upstream portion of the outer path 160 easily flows into the inner path 150 through the through-hole 121A of the upstream side as indicated by the arrow of FIG. 12.

As illustrated in FIG. 12, in the ion exchanger 100, the mesh M1 as a first mesh is provided in the communicating portion 122A of the lid portion 122 and the through-hole 121A of the upstream side of the cylindrical portion 121, and the mesh M2 as a second mesh is provided in the through-hole 121A of the downstream side of the cylindrical portion 121, the communicating portion 121C of the downstream end 121B, and the communicating hole 171 of the partitioning wall 170.

The mesh M1 has a screen opening smaller than a particle size of the ion exchange resin. The screen opening of the mesh M1 is set to, approximately, 200 microns. The mesh M1 prevents the ion exchange resin filled in the inner casing 120 from leaking to the outside.

The mesh M2 has a screen opening smaller than that of the mesh M1 and is capable of removing a foreign object contained in the coolant. The screen opening of the mesh M2 is set to, approximately, 100 microns. The mesh M2 prevents the ion exchange resin filled in the inner casing 120 from leaking to the outside and serves as a filter that removes a foreign object as the coolant passes.

In the ion exchanger 100 according to the fifth embodiment, the partitioning wall 170 having the communicating hole 171 is provided in the outer path 160 between the through-hole 121A of the upstream side and the through-hole 121A of the downstream side. Therefore, the coolant of the upstream portion of the outer path 160 easily flows to the inner path 150 through the through-hole 121A of the upstream side. As a result, it is possible to improve the ion exchange rate of the ion exchanger 100.

Since the partitioning wall 170 is arranged in rear of the through-hole 121A of the upstream side, the coolant of the upstream portion of the outer path 160 flows into the inner path 150 through through-hole 121A of the upstream side in the vicinity of the partitioning wall 170, that is, the downstream position of through-hole 121A of the upstream side. For this reason, it is possible to prevent the ion exchange resin of the upstream side from being locally used and relatively uniformly use the ion exchange resin across the entire area. As a result, it is possible to reliably remove an impurity ion of the coolant for a long time.

In the ion exchanger 100 according to the fifth embodiment, the mesh M1 is provided in the communicating portion 122A of the lid portion 122 and the through-hole 121A of the upstream side of the cylindrical portion 121, and the mesh M2 having a screen opening smaller than that of the mesh M1 is provided in the through-hole 121A of the downstream side of the cylindrical portion 121, the communicating portion 121C of the downstream end 121B, and the communicating hole 171 of the partitioning wall 170. Therefore, it is possible to prevent the ion exchange resin from leaking from the inner casing 120 and remove a foreign object contained in the coolant. As a result, it is possible to supply the fuel cell stack 10 with a coolant that does not contain a foreign object with a low electric conductivity.

Figure 13:
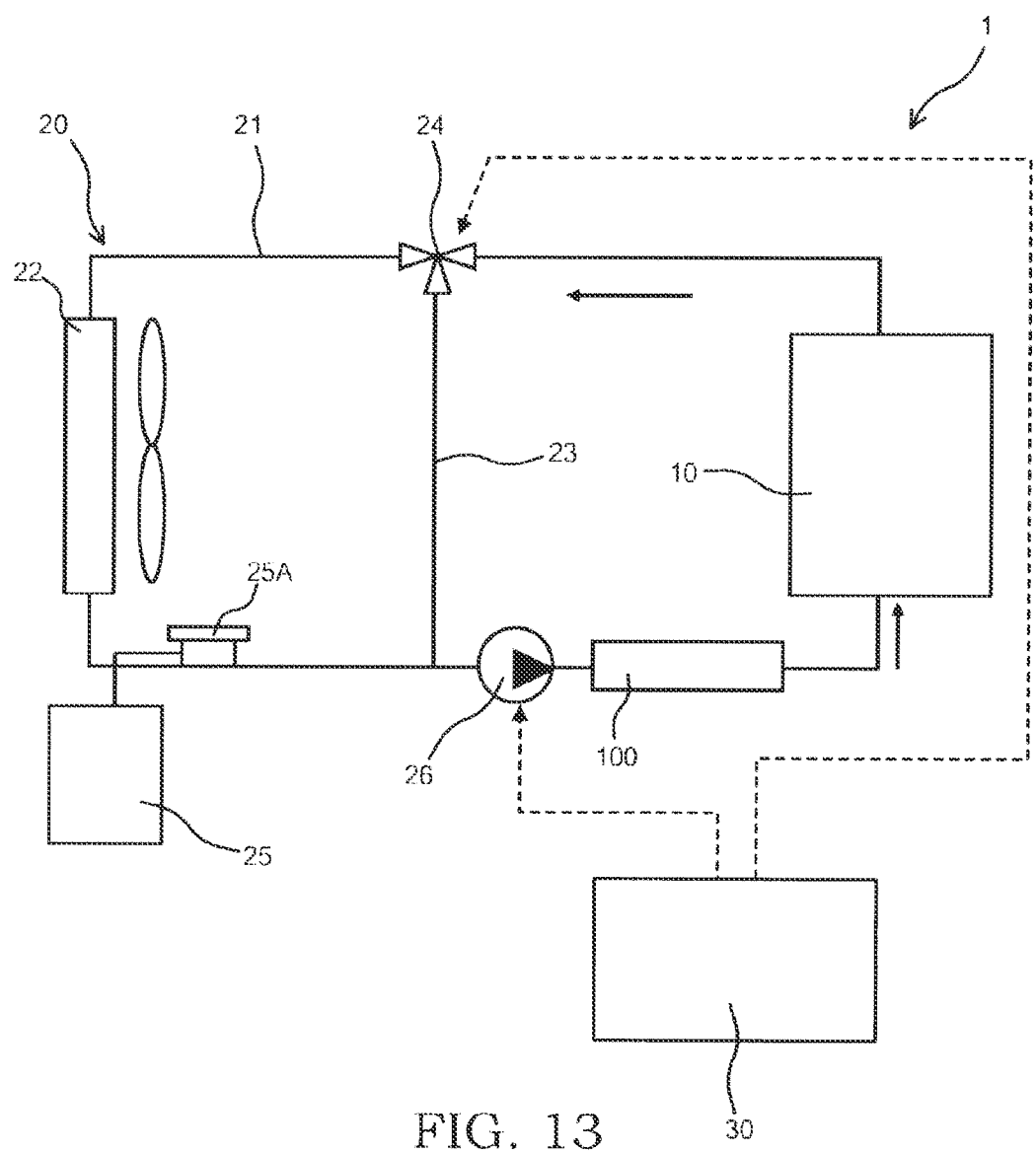
FIG. 13 is a schematic view illustrating a modification of the fuel cell system.

In the first to fifth embodiments, as illustrated in FIG. 1, the ion exchanger 100 is provided in the coolant circulation path 21 between the downstream end junction of the bypass path 23 and the circulating pump 26. However, the ion exchanger 100 may foe provided in the coolant circulation path 21 between the circulating pump 26 and the fuel cell stack 10 as illustrated in FIG. 13. In this manner, in the cooler 20 having the ion exchanger 100 arranged immediately before the fuel cell stack 10, it is possible to reduce an electric conductivity of the coolant flowing to the fuel cell stack 10 and remove a foreign object of the coolant as small as possible.

When the ion exchanger 100 is provided in the vicinity of the circulating pump 20 between the circulating pump 26 and the fuel cell stack 10, a high-pressure coolant discharged from the circulating pump 26 is immediately supplied to the ion exchanger 100.

As a volume of the ion exchange resin occupying the inside of the inner casing 120 is reduced due to deterioration of the ion exchange resin and the like, a gap between the ion exchange resins increases, and the ion exchange rate decreases. However, if the high-pressure coolant discharged from the circulating pump 26 is immediately supplied to the ion exchanger 100, the ion exchange resin is surged to the downstream end 121B side of the inner casing 120 by virtue of the discharge pressure, and thus it is possible to suppress an increase of the gap between the ion exchange resins. Therefore, in the cooler 20 having the ion exchanger 100 arranged in the vicinity of the circulating pump 26, it is possible to suppress reduction of the ion exchange rate of the ion exchanger 100.

Embodiments of the present invention were described above, but the above embodiments merely illustrate a part of examples of applications of the present invention, and the technical scope of the present invention is not limited to the specific configurations described in the embodiments.

The present application claims priority based on Japanese Patent Application No. 2011-226629, filed with the Japan Patent Office on Oct. 14, 2011, the entire contents of which are incorporated into this specification by reference.

The invention claimed is:

1. An ion exchanger configured to remove an impurity ion of a coolant for cooling a fuel cell, comprising:
   an inflow portion having an inflow path where the coolant enters;
   a discharge portion having a discharge path for discharging the coolant;
   an outer casing having an upstream end where the inflow portion is provided and a downstream end where the discharge portion is provided;
   an inner casing housed inside the outer casing;
   an ion exchange resin for removing an impurity ion from the coolant being filled in an inside of the inner casing;
   an outer path formed between the inner casing and the outer casing, the outer path being configured to communicate with the inflow path and the discharge path through a space that does not enclose the ion exchange resin; and
   an inner path that is formed inside the inner casing to cause the inflow path and the discharge path to communicate with each other and is configured to enclose the ion exchange resin,
   wherein the inner casing has a through-hole that causes the inner path and the outer path to communicate with each other.

2. The ion exchanger according to claim 1, wherein a plurality of the through-holes are formed side by side on an outer circumferential surface of the inner casing along a circumferential direction and an axial direction of the inner casing.

3. The ion exchanger according to claim 1, wherein a plurality of the through-holes are formed on an outer circumferential surface of a downstream side of the inner casing.

4. The ion exchanger according to claim 1, wherein a mesh having a screen opening smaller than a particle size of the ion exchange resin is provided in a communicating portion between the inner path and the inflow path, a communicating portion between the inner path and the discharge path, and the through-hole.

5. The ion exchanger according to claim 4, wherein a first mesh having a screen opening smaller than a particle size of the ion exchange resin is provided in the communicating portion between the inner path and the discharge path and the through-hole, and a second mesh that is capable of removing a foreign object contained in the coolant and has a screen opening smaller than that of the first mesh is provided in the communicating portion between the inner path and the inflow path and a communicating portion between the outer path and the inflow path.

6. The ion exchanger according to claim 4, wherein a first mesh having a screen opening smaller than a particle size of the ion exchange resin is provided in the communicating portion between the inner path and the inflow path and the through-hole, and a second mesh that is capable of removing a foreign object contained in the coolant and has a screen opening smaller than that of the first mesh is provided in the communicating portion between the inner path and the discharge path and a communicating portion between the outer path and the discharge path.

7. The ion exchanger according to claim 1, wherein a wall portion configured to guide the coolant is provided in the outer path in order to allow the coolant flowing through the outer path to enter the inner path through the through-hole.

8. The ion exchanger according to claim 1, further comprising a partitioning wall configured to partition the outer path into an upstream portion and a downstream portion; and
   a communicating hole formed in the partitioning wall to cause the upstream and downstream portions of the outer path to communicate with each other.

9. The ion exchanger according to claim 8, wherein a first mesh having a screen opening smaller than a particle size of the ion exchange resin is provided in a communicating portion between the inner path and the inflow path and the through-hole of an upstream side from the partitioning wall, and a second mesh that is capable of removing a foreign object contained in the coolant and has a screen opening smaller than that of the first mesh is provided in a communicating portion between the inner path and the discharge path, the through-hole of a downstream side from the partitioning wall, and the communicating hole of the partitioning wall.

10. A cooler configured to cool a fuel cell using a coolant flowing through a coolant circulation path, comprising:
    an ion exchanger according to claim 1 which is provided in the coolant circulation path;
    a radiator which is provided in the coolant circulation path and is configured to cool the coolant; and
    a circulating pump which is provided in the coolant circulation path and is configured to circulate the coolant,
    wherein the ion exchanger is provided in the coolant circulation path in a downstream side from the radiator.

11. The cooler according to claim 10, wherein the ion exchanger is provided in the coolant circulation path between the circulating pump and the fuel cell in a downstream side from the radiator.

12. The cooler according to claim 11, wherein the ion exchanger is provided in the coolant circulation path in the vicinity of the circulating pump between the circulating pump and the fuel cell.

13. The cooler according to claim 12, wherein the ion exchanger is provided in the coolant circulation path between the circulating pump and the fuel cell at a location closer to the circulating pump than to the fuel cell.

14. The ion exchanger according to claim 1, wherein the outer path is directly connected with the inflow path and the discharge path through the space that does not enclose the ion exchange resin.

15. The ion exchanger according to claim 1, wherein the inner casing is configured to cause the coolant to flow from the outer path to the inner path through the through-hole.

* * * * *